Patented Oct. 1, 1929

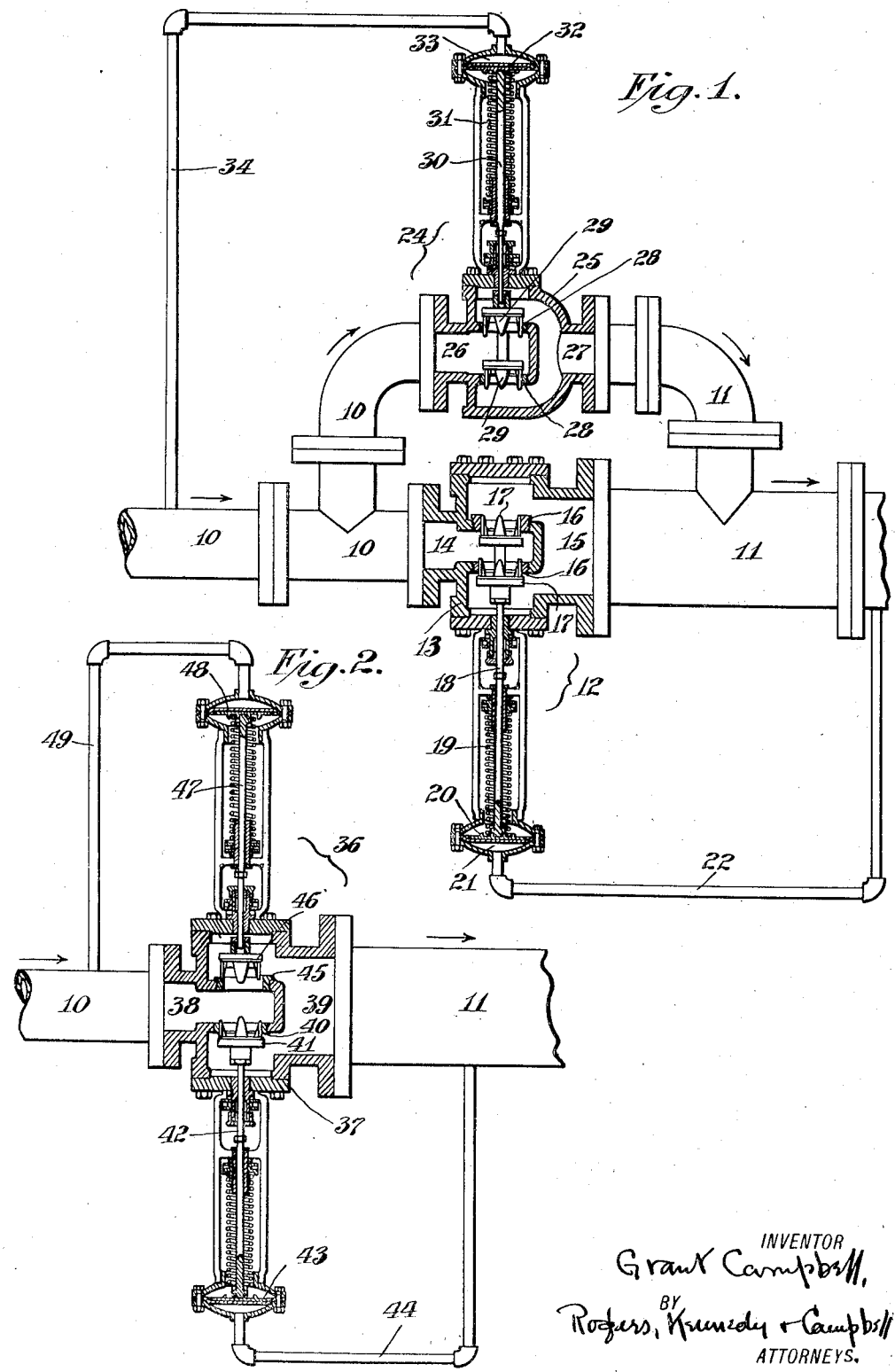

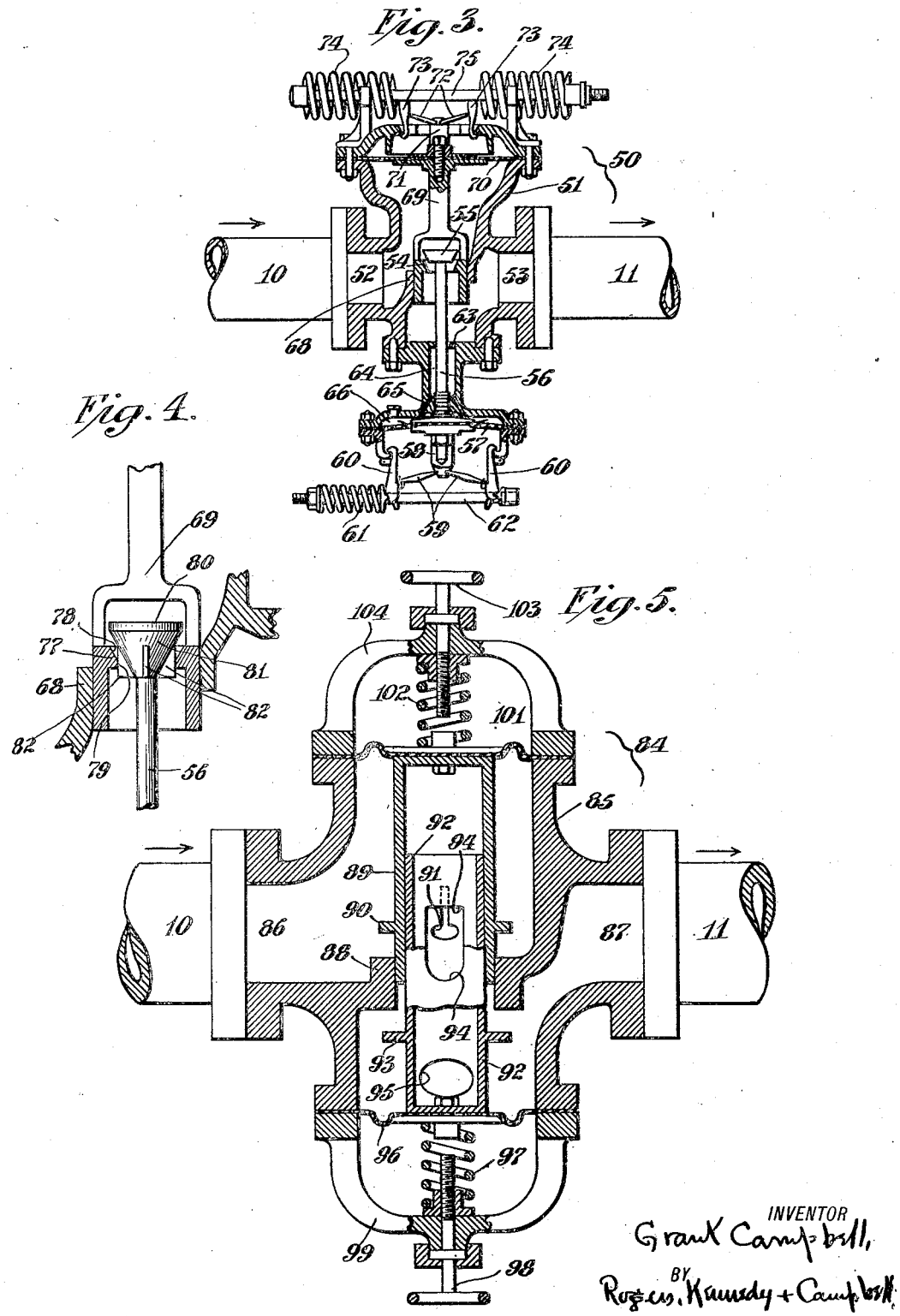

1,729,819

UNITED STATES PATENT OFFICE

GRANT CAMPBELL, OF SHORT HILLS, NEW JERSEY, ASSIGNOR TO CAMPBELL ENGINEERING COMPANY, OF NEWARK, NEW JERSEY, A CORPORATION OF NEW JERSEY

PRESSURE REGULATION

Application filed June 4, 1924. Serial No. 717,849.

This invention relates to pressure regulation, and includes a novel method for regulating pressure, or flow, and a novel apparatus for the same purpose, which may in some cases be embodied in a unitary organization, and termed a reducing valve for convenience. The invention is of utility wherever a predetermined or constant pressure is desired to be delivered, whether high pressure, low pressure or vacuum, referring either to the flow of liquids, or of elastic fluids, exemplified by gases (compressed air) or vapors (steam). The invention is of especial utility where a constant or regulated pressure is desired to be delivered notwithstanding substantial fluctuations of the supply pressure or variations in the source of flow, or changes in the duty or load to be met. The delivery pressure to be controlled is not necessarily that of the fluid itself, but may be the resulting pressure of the operation of a pump, blower or the like. Specific uses of the invention include the following. Controlling the steam or other pressure in heating systems; controlling the feed of water to boilers, in which it may be desired for example to maintain the delivered pressure at the predetermined figure of 15 pounds above the boiler pressure; the control of air feed for purposes of combustion, for example, through a blower engine delivering to a furnace, for regulating or controlling the combustion or resulting steam pressure; and the like.

The main object of the invention is to secure more efficient and reliable regulation of pressure or flow in the above or analogous fields of utility. A specific object is to give better control, or afford better uniformity, of delivered pressure notwithstanding substantial fluctuations of supply pressure. Other and further objects and advantages of the present invention will be explained in the hereinafter following description of one or more embodiments thereof or will be apparent to those skilled in the art. To the attainment of such objects and advantages the present invention consists in the novel method and apparatus for pressure regulation and the novel features of combination, arrangement and construction herein illustrated or described.

In the accompanying drawings Fig. 1 shows an illustrative form of the present invention, embodying the apparatus features and available for practising the method features, certain elements of the combination being shown in central cross section to avoid the necessity of separate views thereof.

Fig. 2 is a view similar to Fig. 1 of a modified form of apparatus.

Fig. 3 is a similar view showing a third embodiment or modification.

Fig. 4 shows a novel valve construction which may be substituted for that shown in Fig. 3 or other embodiments.

Fig. 5 shows a fourth embodiment or example of the present invention.

In one aspect the essence of the present invention may be stated to consist in the regulation of fluid pressure by adjusting the flow under the control of both the supply pressure and the delivery pressure. In this way the delivery pressure is controlled not only by the conditions at the delivery side of the control point, but also by the conditions at the supply side. This combined control gives superior results. The instance may be taken where the initial or supply pressure is liable to fluctuate between 55 and 80 pounds per square inch, while it is desired to maintain a delivered pressure of about 30 pounds (29 to 31). Of course predetermined variation or adjustment of the delivered pressure may sometimes be desirable, and is attainable by adjustment of the action of the present invention. A distinct difficulty in maintaining the desired or predetermined delivery pressure is encountered wherever the supply pressure fluctuates substantially, for example as in the instance just mentioned. Where a reducing valve is controlled by the secondary or delivery pressure only it may work satisfactorily so long as the primary or supply pressure is uniform, but with substantial fluctuations the operation is very unreliable. This may be described as due to the fact that the necessary increase of flow, or vice versa, to maintain the desired delivery pressure will not be uniform if the supply pressure varies substantially. With the present invention the flow, or opening or closing of the valve, is controlled not only by the pressure drop or rise at the delivery end, but also by the pressure variations at the supply end. Thus in the case stated if the delivery pressure commences to drop below the desired 30 pounds the flow will be increased by control from the delivery end; and if the supply pressure drops toward 55 pounds this is arranged to effect an increase of flow, or opening of valve, in such manner that the delivered pressure may be maintained at the desired figure.

Referring particularly to the embodiment of Fig. 1 this shows the supply or primary service pipe 10 with its branches, and the delivery or secondary service pipe 11 with its branches, and between them the pressure regulating means. In this form two separate valves are shown and each of them may be a reducing valve, for example of some well known type. The reducing valve 12, controlled by the low or delivery pressure, is shown as a balanced valve with double seat and spring actuated. The valve body 13 has inlet 14 and outlet 15, with two valve seats 16 engaged by disks 17, the two disks being on the same valve stem 18; an arrangement by which the force of the pressure or flow balances itself against the two disks. This enables the valve to be properly controlled through a valve spring 19 surrounding the stem 18 and a diaphragm 20 connected with the outer extremity of the stem. The diaphragm chamber 21 is connected by a control pipe 22 with the delivery pipe 11. When the elastic fluid is steam it will be understood that the lower pipe 22, and the diaphragm chamber 21, fill up with water, which protects the diaphragm from the action of steam, enabling the use of a rubber diaphragm. With any decrease of delivered pressure the diaphragm 20 descends, thus opening the valve and supplying additional flow to restore or maintain the desired pressure.

As stated, however, this action of the valve 12 is insufficient in case of material fluctuations of the supply pressure in pipe 10, for the valve will not permit the same quantity of flow with a low as with a high supply pressure. The second valve 24 corrects this defect. It may be similar to valve 12, having body 25, inlet 26, outlet 27, with valve seats 28 and disks 29, the valve stem 30 surrounded by spring 31 and connected to diaphragm 32, the chamber 33 of which is connected by control pipe 34 with the supply pipe 10.

With this arrangement any material decrease in supply pressure will cause the opening of valve 24, giving an increased flow, readily calculated and adjusted to offset substantially the loss of flow in valve 12 due to drop of supply pressure, and vice versa. In other words the valve 24 offsets the difficulties arising from variations of supply pressure, and enables the valve 12 accurately to control the delivered pressure against variations therein. The action may be described as increasing the fluid flow correctively upon a decrease of either the supply pressure or the delivery pressure and vice versa, thereby attaining one of the main objects of the present invention.

It will be understood that the particular embodiment is only illustrative and that the principles may be employed with endless variety of embodiments. The valve-form and connections shown are not intended as limitations. The illustrated form of diaphragm may be replaced by a perforated diaphragm having connections with both ends of the system. Indeed the diaphragm may be replaced by a piston or any other movable pressure-sensitive element. In using the word diaphragm it will be understood that any equivalent pressure responsive control device susceptible to fluctuations of pressure is intended to be included.

Fig. 2 shows an embodiment in which the branched or by-pass arrangement of Fig. 1 is obviated, the entire valve mechanism 36 involving only a single structure. The valve body 37 has inlet 38 and outlet 39. Secondary-pressure control is afforded by means of valve seat 40, engaged by disk 41, mounted on stem 42, extending to diaphragm 43, connected by control pipe 44 with the delivery pipe 11. Primary-pressure control is effected through valve seat 45, engaged by disk 46, the stem 47 of which extends to diaphragm 48, connected by control pipe 49 with the primary pipe or conduit 10. Decrease of delivered pressure separates valve disk 41 from seat 40, increasing flow, while decrease of primary-pressure causes the separating of disk 46 from seat 45, thus giving increased flow, offsetting the decrease of primary-pressure; and vice versa. It will be understood that the adjustment of the primary-pressure control device or valve is to be such as to bring the secondary-pressure nearly, but not entirely, up to the desired pressure, this action being supplemented by the secondary-pressure control, insuring the exact desired secondary-pressure.

Fig. 3 shows an embodiment in which only a single valve seat and disk are shown, and with different types of valve mechanism, and other modifications. The combined valve structure 50 comprises the valve body 51 having inlet and outlet ports 52 and 53, with a valve seat 54 engaged by disk 55, the stem 56 of which extends to a diaphragm 57 which, in this case, may be of rubber. The diaphragm has an exterior stud or projection 58 on which inward pressure is maintained through toggle link 59 operated by levers 60 and a spring 61 on a transverse stem 62. The connection from the secondary-pressure may be from the interior of the valve casing through passage 63 into a chamber 64 surrounding the stem 56, and passages 65 from that chamber into the diaphragm chamber 66. By this arrangement decrease of delivered pressure permits the spring 61 to elevate the diaphragm, thus raising the valve disk 55 away from its seat.

In this embodiment the valve seat 54 is movable, sliding in a cylindrical portion 68 of the valve body. The entire flow from supply to delivery side is between the valve seat 54 and disk 55. The flow is increased by the lifting of disk 55 as stated, or by the lowering of the seat 54, or by both; and vice versa. In order to control the movements of the seat it is shown connected by a forked stem 69 with a diaphragm 70, which in this case should be of metal if steam is being handled, on account of the direct contact of the steam with the diaphragm. The exterior stud 71 on the diaphragm cooperates with the toggle links 72 and levers 73 in such manner that the pressure of springs 74 is constantly applied through stem 75 and the toggle to thrust the diaphragm inward. By this arrangement decrease of primary-pressure allows the diaphragm to move inward, thus lowering the valve seat 54 and increasing the flow, with the results already described.

The modification shown in Fig. 3 has been made the subject of a divisional application, Serial No. 119,346, filed June 29, 1926, and the claims to the features thereof have been transferred to the divisional application: and this statement refers also to the features illustrated in Fig. 4 hereof.

Fig. 4 shows a valve seat and disk structure that may advantageously be used in place of that shown in Fig. 3. The valve seat 77 may have a yoked stem 69 as before, and may slide in the sleeve or bearing 68. The seat has its conical surface 78 corresponding with the cone of the disk and a cylindrical portion 79 for guiding purposes. The valve disk 80 may have the stem 56 as before, and is formed with a conical body 81 which corresponds with the cone 78 of the seat, but is continued inwardly substantially to the stem 56. The conical body 81 is also formed with a plurality of guiding fins 82 engaging the cylindrical surface 79 of the seat to maintain the valve disk central. This form of valve is of advantage for the general purposes of the present invention and is considered to be novel per se for various uses. It gives better differential pressure regulation; the longer movement of adjustment between the closed position of the valve and its maximum open position affords closer and more accurate regulation. It is well known that a flat disk gives its maximum opening when it has receded about one quarter of the diameter of the opening. With the described structure the increase of flow is progressive through a far longer range of movement, so that the flow regulation is more gradual and accurate. As the conical disk lifts it increases the annular space within the seat, which does not require to be conical as shown, and the flow is finely controlled from maximum to minimum.

Fig. 5 shows a modification 84 employing the sleeve type of valve. The valve body or casing 85 has inlet 86 and outlet 87, with a cylindrical bearing 88. This bearing is engaged by an outer valve sleeve 89 having a stop flange 90 to engage the bearing, and having ports 91 which may be of key-hole shape, or other form to give a finer regulation of flow, with gradual, progressive opening or closing, such as a series of openings uncovered successively. The inner valve sleeve 92 has a stop flange 93, and opposite ports 94 cooperating with the ports 91. By having such plural ports the pressure is balanced. The inner sleeve 92 may have lower openings 95 leading to the valve outlet 87. The sleeve may be connected directly or by a stem to a diaphragm 96. The diaphragms hereof may be composed of rubber if it be assumed that compressed air is being handled, this construction being well adapted for air pressure control. Metal diaphragms may be substituted, with proper modification of shape. The diaphragm 96 is pressed inwardly by a spring 97 having a regulating screw 98 mounted in a yoke bracket 99. By this regulation the action of the valve can be controlled. The outer valve sleeve 89 is shown directly connected to diaphragm 101, pressed inwardly by spring 102, having regulating screw 103 supported in a bracket 104. When the delivered pressure decreases the diaphragm 96 is allowed to rise, thus uncovering more of the key-hole port 91 and increasing air flow; and this also lowers the other diaphragm, and sleeve 89, the low pressure working both ways, the diaphragm 101 serving, at its middle, for low pressure, at its rim for high pressure, control. When the primary-pressure decreases the diaphragm 101 moves downwardly, carrying the sleeve 89 and thus opening the valve ports to a greater extent. This structure is compact and self-contained; also easily regulated and sensitive in its control, due to the double action of the low or delivery pressure, on the two diaphragms.

While the specific embodiments show regulation of pressure and flow by control from both supply and delivery, the underlying invention is more widely applicable. It is believed this is the first valve regulation with double control, from any two factors. Also the first regulation of flow or pressure from the pressure fluctuations at the supply side, this being of utility per se, and in association with any other control, for example a thermostatic control, or temperature sensitive element. The present invention possesses utility also in a case where the control is reversed in action, i. e., where a drop of supply pressure may be caused to shut off somewhat the valve port and flow.

Referring further to the modification of Fig. 5 it will be seen that the upper diaphragm, with its separated areas, acted on partly by supply pressure, partly by delivery pressure, constitutes a device in itself capable of the double control of this invention, and the lower diaphragm and connected parts could be dispensed with by proper proportioning of the upper diaphragm and connected parts.

It will thus be seen that I have described several embodiments of the underlying principles of the present invention. Since many matters of combination, arrangement, design and detail may be variously modified it is not intended to limit the invention to such matters except so far as specified in the appended claims.

What is claimed is:

1. Apparatus for regulating the delivery pressure of fluids comprising valve means having interior passages normally open from the supply passage to the delivery passage, a plurality of separate movable valve parts each adapted to restrict regulably the flow from the supply passage to the delivery passage, a pressure sensitive means operated from the supply pressure to move one only of said valve parts to retrict the flow from the supply passage to the delivery passage upon increase of supply pressure and vice versa, to give an approximate adjustment of delivery pressure, and a second pressure sensitive means operated from the delivery pressure to move the other only of said valve parts to restrict the flow from the supply passage to the delivery passage upon increase of delivery pressure and vice versa, to give a supplemental finer adjustment of the delivery pressure.

2. Apparatus for regulating the delivery pressure of fluids comprising valve means having a port normally open from the supply side to the delivery side thereof, a plurality of movable valve parts each adapted to adjust said port, pressure sensitive means operated from the supply pressure to move one of said valve parts to restrict the port upon increase of supply pressure and vice versa, and pressure sensitive means operated from the delivery pressure to move the other of said valve parts to restrict the port upon increase of delivery pressure and vice versa.

3. Apparatus for regulating the delivery pressure of fluids comprising a ported valve normally open from the supply side to the delivery side thereof, a plurality of valve parts movable one upon the other and each adapted to restrict regulably the valve port, pressure sensitive means operated from the supply pressure to move one of said valve parts to restrict the port upon increase of supply pressure and vice versa, and pressure sensitive mean operated from the delivery pressure to move the other of said valve parts to restrict the port upon increase of delivery and vice versa.

4. Apparatus for regulating the pressure of fluids comprising a valve containing a bearing, a hollow sleeve sliding therein and a second hollow sleeve sliding in the first, communicating ports in the sleeves, pressure responsive means for controlling one sleeve from the supply side, and means for controlling the other sleeve from the delivery side.

5. Apparatus for regulating the pressure of fluids comprising a valve device, a pressure sensitive element controlling said valve device and having separated control areas, fluid connections from the supply side to portions of the element and fluid connections from the delivery side to other portions of the element whereby the element and valve device are operated by pressure variations at either or both sides.

6. Apparatus as in claim 5 and wherein the annular peripheral portion of the element is operated upon by the supply pressure and the central portion of the element by the delivery pressure, in such manner that drop in either pressure opens the valve device.

7. Apparatus for regulating the pressure of fluids comprising a valve containing a bearing, a ported member sliding on the bearing, and a second ported member sliding on the first, two pressure responsive devices both operated upon by the delivery pressure and connected to move said ported members in opposite directions upon change of delivery pressure.

In testimony whereof, I have affixed my signature hereto.

GRANT CAMPBELL.